Dec. 25, 1956     O. E. PARHANIEMI     2,775,153
STUD DRIVERS AND PULLERS
Filed March 25, 1955
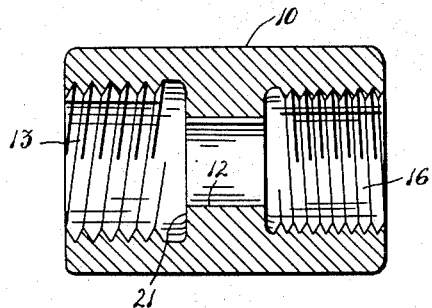
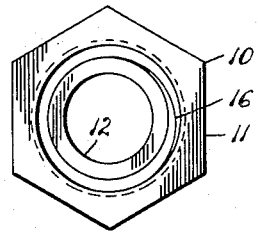
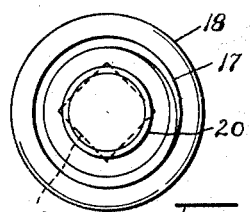
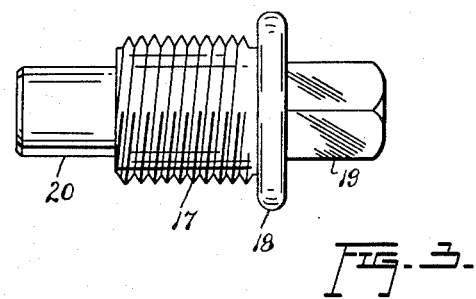
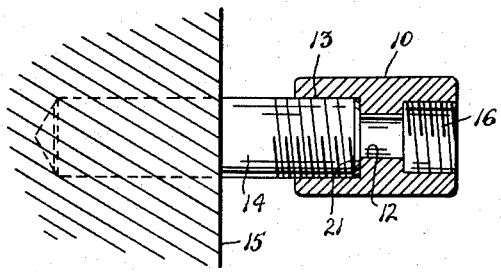
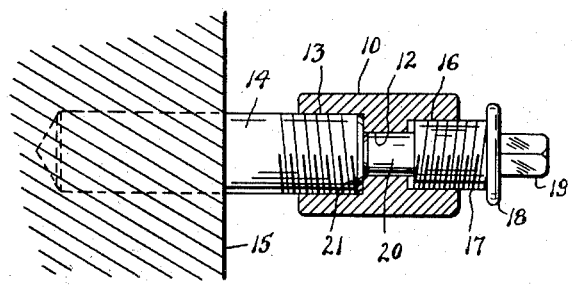
Inventor:
Osmo E. Parhaniemi United States Patent Office 2,775,153
Patented Dec. 25, 1956

2,775,153

STUD DRIVERS AND PULLERS

Osmo E. Parhaniemi, Astoria, Oreg., assignor of one-half to Leonard J. Parhaniemi, Astoria, Oreg.

Application March 25, 1955, Serial No. 496,822

2 Claims. (Cl. 81—53)

This invention relates to new and useful improvements and structural refinements in tools for installing and removing threaded studs, and the principal object of the invention is to provide a simple, easily manipulable tool of this nature whereby the stud installing or removing operation may be quickly and conveniently effected without any danger of breaking the stud or damaging the thread thereof.

With the above more important object and features in view and such other objects and features as may become apparent as this specification proceeds, the invention resides in the arrangement of parts and details of construction substantially as shown in the accompanying drawing, wherein like characters of reference are used to designate like parts and wherein:

Figure 1 is a longitudinal sectional view showing the main body of the tool;

Figure 2 is an end view thereof;

Figure 3 is a side elevational view of a driver screw used in the invention;

Figure 4 is an end view of the driver screw;

Figure 5 is a sectional view of the invention in operation in the installation of a stud; and Figure 6 is a sectional view of the invention in operation in the removal of a stud.

Referring now to the accompanying drawing in detail, the tool in accordance with the invention comprises a body 10 having a polygonal outer surface 11 adapted to receive a wrench, or the like, and also having an axial bore provided intermediate its ends with an inwardly projecting annular shoulder 12. One end portion of the bore is formed with a screw-thread 13 to receive the threaded outer end portion of a stud 14 which is to be installed in or removed from the work 15, as shown in Figures 5 and 6. The other end portion of the bore in the body 10 is formed with a screw-thread 16 to receive a driver screw 17, hereinafter more fully described.

As is best shown in Figure 1, the screw-thread 16 is of a relatively smaller diameter and of a relatively finer pitch than the screw-thread 13 and is of an opposite hand.

The driver screw 17 is provided at its outer end with an enlarged disc-shaped collar 18 carrying a polygonal wrench-receiving head 19, while the inner end of the driver screw is equipped with a cylindrical shank 20 of a smaller diameter than the driver screw. The shank 20 is rotatably receivable in the opening defined by the shoulder 12 in the body 10, as will be clearly apparent.

When the invention is placed in use for installing a stud 14 in the work 15, the body 10 is simply mounted on the stud so that the outer end portion of the stud is received in the screw-thread 13 and comes in abutment with the face 21 of the shoulder 12, as shown in Figure 5. In this manner, the body 10 is locked on the stud and when the body is rotated by a wrench, or the like, the stud will be rotated therewith and may thus be easily driven home in the work 15.

Alternatively, when it is desired to remove the stud from the work, the body 10 is again installed on the stud so that the stud abuts the face 21 of the shoulder 12. Thereupon, the driver screw 17 is installed in the screw-thread 16 of the body 10 until the shank 20 thereof projects through the opening in the shoulder 12 and comes in abutment with the end of the stud 14, as illustrated in Figure 6. As already stated, the threads 13, 16 are of opposite hands and when the shank 20 abuts the stud and rotation continues to be imparted to the driver screw 17, the latter as well as the body 10 will be locked on the stud for rotation therewith and the stud will be effectively removed from the work 15. In this connection it is to be noted that the comparatively smaller and finer thread 16, 17 will materially assist in locking the shank 20 and the body 10 on the comparatively larger and coarser thread of the stud.

After the stud has been removed from the work 15, the body 10 may be readily removed from the stud by simply loosening the driver screw 17 and unlocking the shank 20 from the stud in the body.

While in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. A tool for selectively installing and removing threaded studs, said tool comprising a body having a wrench-receiving polygonal outer surface and provided with an axial bore, opposite end portions of said bore being provided with oppositely screw-threaded counterbores whereby the intermediate portion of the bore is of a smaller diameter than the counterbored end portions and whereby said body provides at the inner ends of the counterbores a pair of flat annular shoulders disposed in planes normal to the axis of the bore, one of said counterbores being adapted to receive a stud so that the latter abuts the shoulder at the inner end thereof to lock said body on the stud for rotation therewith, a driver screw provided in the other counterbore, and a cylindrical shank provided at the inner end of said driver screw, said shank being of greater length than said intermediate portion of said bore whereby the inner end face thereof may be locked against the stated stud and being of substantially the same diameter as and rotatable in said intermediate bore portion for supportable engagement therewith.

2. The device as defined in claim 1 wherein the driver screw receiving counterbore in said body is provided with a relatively fine thread and the stud receiving counterbore is provided with a relatively coarse thread, the driver screw receiving counterbore being of a smaller diameter than the stud receiving counterbore.

References Cited in the file of this patent

UNITED STATES PATENTS

| 691,406 | Morgan | Jan. 2, 1902 |
| 1,665,691 | Perry | Dec. 22, 1925 |
| 1,815,500 | Doan | July 21, 1931 |
| 2,497,214 | Dreyer | Feb. 14, 1950 |

FOREIGN PATENTS

| 18,142 | Great Britain | of 1890 |
| 346,351 | France | Nov. 23, 1904 |
| 125,289 | Great Britain | Apr. 17, 1917 |